United States Patent [19]
Staehle et al.

[11] Patent Number: 5,810,895
[45] Date of Patent: Sep. 22, 1998

[54] ROTATING PACK BED FILTER WITH CONTINUOUS CLEANING SYSTEM

[75] Inventors: Richard C. Staehle, Flemington; James T. Cash, Hackettstown, both of N.J.

[73] Assignee: Regenerative Environmental Equipment Company, Inc., Branchburg, N.J.

[21] Appl. No.: 276,645

[22] Filed: Jul. 19, 1994

[51] Int. Cl.$^6$ ................................................ B01D 46/04
[52] U.S. Cl. .............................................. 55/282; 55/400
[58] Field of Search ............................ 55/276, 282, 400

[56] References Cited

U.S. PATENT DOCUMENTS

| | | | |
|---|---|---|---|
| 3,182,649 | 5/1965 | Teller | 96/125 |
| 3,183,649 | 5/1965 | Teller | 55/179 |
| 3,499,267 | 3/1970 | King et al. | 55/290 |
| 3,509,834 | 5/1970 | Rosenberg et al. | 110/8 |
| 4,280,416 | 7/1981 | Edgerton | 110/254 |
| 4,431,405 | 2/1984 | Eatherton | 432/72 |
| 4,523,935 | 6/1985 | Takagi et al. | 55/282 |
| 4,778,492 | 10/1988 | Dawson | 55/78 |
| 4,863,656 | 9/1989 | Hindström | 264/62 |
| 4,897,528 | 1/1990 | Anthony | 219/497 |
| 4,927,435 | 5/1990 | Anson | 55/96 |
| 4,971,026 | 11/1990 | Fineblum | 126/110 R |
| 5,057,128 | 10/1991 | Panzica et al. | 55/400 |
| 5,192,429 | 3/1993 | Bader | 210/170 |
| 5,198,111 | 3/1993 | Davis | 210/408 |
| 5,221,522 | 6/1993 | Cash | 422/171 |

FOREIGN PATENT DOCUMENTS

| | | |
|---|---|---|
| A-21 56 957 | 5/1973 | Germany . |
| A-34 14 652 | 12/1985 | Germany . |

OTHER PUBLICATIONS

A.S. Ward, "Techniques for the Removel of Particulates from Hot Gas Products of Fluidised Bed Coal Combustion," *Filtration & Separation*, Nov./Dec. 1981, pp. 542–550.

*Primary Examiner*—David W. Wu
*Attorney, Agent, or Firm*—Howrey & Simon

[57] ABSTRACT

Apparatus for removing a wide variety of differing solid and aerosol waste materials from effluent or exhaust streams produced by an industrial process. This invention may be especially useful as a pre- or post-conditioner of the effluent to prevent plugging in any number of available pollution control devices. More particularly, a rotating pack bed filter removes solid and aerosol waste materials, if present, from an effluent and simultaneously regenerates the filter media by (1) heating to thermally decompose the collected material trapped in the filter media into a residue and to drive off gaseous pollutants carried by the collected material and (2) cleaning to remove the residue from the media.

24 Claims, 7 Drawing Sheets

ROTATING PACK BED FILTER WITH CONTINUOUS CLEANING SYSTEM

BACKGROUND OF THE INVENTION

The invention relates in general to an improved separation device that removes a wide variety of differing solid and aerosol waste materials from exhaust streams produced by an industrial process (hereinafter referred to as "effluent"). The invention may be especially useful as a pre- or post-conditioner of effluent to prevent it from clogging or plugging any number of available air pollution control devices, such as thermal oxidizers, catalytic oxidizers or scrubbers. More particularly, the invention relates to a rotating pack bed filter for removing solid and aerosol waste materials from an effluent and for simultaneously regenerating the filter media. The industrial process that generates the effluent then may operate continuously without interruption to replace or regenerate the media. The rotating pack bed filter of the invention typically is positioned upstream of the air pollution control device used to remove waste materials. For example, the downstream pollution control device may be a thermal oxidizer that decomposes gaseous pollutants by high temperature oxidation employing, for instance, a regenerative, catalytic, or tube type process or the like. The solid and aerosol waste materials in the effluent, which unlike gaseous pollutants have a size and mass that may clog the flow path in heat exchange or catalyst material within the oxidizer, are efficiently removed by the rotating pack bed filter. Any gaseous pollutants in the effluent, typically volatile organic compounds ("VOC's"), then are eliminated by decomposition in the oxidizer.

The invention was specifically designed for use with a regenerative thermal oxidizer ("RTO") in a wood drying process, similar to that disclosed in U.S. Pat. No. 4,431,405 to Eatherfon, although it is by no means limited to such wood drying applications. However, the invention is particularly advantageous for use in processes that produce an effluent containing solids such as dry, gritty particulates and aerosols such as sticky, gummy tars, as should be evident from the discussion below. In a typical wood dryer, wood flakes are dried for later use in producing particle board, strand board or similar products. The wood flakes are blown through a heated dryer and then the product is separated from smaller particulate, usually through the use of a large diameter cyclone. The drying process emits an exhaust stream or effluent containing gaseous organic pollutants (e.g., VOC's), and particulates and tars, which may be laden with VOC's.

Use of an RTO in such an environment produced concern that the stoneware in the heat exchangers of the RTO would quickly become clogged by both the organic (burnable) and inorganic (non-burnable) matter in the effluent. Preliminary tests using an RTO of the type described and claimed in U.S. Pat. No. 5,221,522 to Cash confirmed that filtration was necessary to prevent the stoneware in the RTO from clogging. To date, particulate generally has been removed from effluent by use of wet electrostatic precipitators, electrostatic gravel bed filters, and baghouses. These conventional filtration techniques were not deemed suitable for this application for several reasons. First, the heavy loading of particulate and the widely varying types of materials to be filtered would likely clog such conventional filters within an unacceptably short period of time such that the media must be replaced or regenerated frequently. For example, a typical gravel bed filter suffers from the same type of plugging problems that can stop the flow of effluent through the gravel. Although the filter media may be replaced, this is inefficient because the process producing the effluent must be interrupted to change the media and it is also expensive where new filter media is provided. Secondly, the collected solids and aerosols themselves typically contain gaseous pollutants, such as VOC's, and therefore require specialized, additional disposal techniques. For instance, a wet electrostatic precipitator requires further downstream waste water treatment and produces more disposal problems created by VOC-laden solids and aerosols. The fact that the collected waste material to be removed from the media are laden with VOC's was an important consideration in developing the commercially acceptable and feasible filter of the invention since the spent filter media is not easily disposed of or regenerated due to the presence of the VOC's.

Accordingly, an effective way was needed to continuously remove the solid and aerosol waste from an effluent and regenerate the filter media without requiring additional VOC disposal steps, while at the same time enabling the downstream pollution control device to operate according to its normal capabilities and obviate the need to interrupt the effluent producing process. A review of the prior art effluent treatment and filtration apparatus below shows that conventional filtration techniques do not satisfy this need.

One method of treating the effluent from wood processing plants is described in the aforementioned Eatherton patent, which discloses treating the effluent by passing it through a container of wood chips, which serve as a filter media of sorts for removing the pollutants. As such it provides no teaching relevant to a regenerative filtration system for removing solids and aerosols from effluent prior to treatment of the gaseous pollutants in a pollution control device. Eatherton's process also suffers from numerous disadvantages including the requirement for a significant amount of wood chip handling equipment to continuously add, remove and recycle the wood chips.

Continuous regeneration of other types of filter media also are known. For example, U.S. Pat. No. 4,927,435 to Anson discloses a rotating drum filter for removing dust from a fluid stream in which a fibrous filter medium is removed from the filter, cleaned, and then recycled into the top of the drum. Anson suffers from some of the same disadvantages as Eatherton as it requires significant filter material handling equipment and also provides no guidance for filtration prior to treatment of gaseous pollutants.

Continuous regeneration of filter media by cleaning the media when it becomes clogged is known as well. For example, U.S. Pat. No. 5,198,111 to Davis, U.S. Pat. No. 5,192,429 to Bader, and U.S. Pat. No. 4,863,656 to Hindstrom disclose devices for separating solids from liquid process streams that have associated filter cleaning mechanisms. Obviously, these patents have little or no applicability to Applicants' problem of removing solids and aerosols from a gaseous effluent prior to treatment in a gas pollution control device.

Slightly more relevant than the liquid/solid separators discussed above are the known filters for removing solids from gas streams that have vacuum cleaning mechanisms for regenerating the filter. Examples of these type of filters are shown in U.S. Pat. No. 3,499,267 to King, Jr., et. al, and U.S. Pat. No. 4,971,016 to Fineblum. King discloses a rotary drum filter for extracting airborne lint fly, fibers, dust and other fine particles in which the filter is cleaned by a vacuum. Fineblum discloses an air filter system for a furnace where dust is removed from a collecting filter and either sent to a combustion chamber or a collection receptacle. These conventional methods of solids removal are equally unsuited for removing solids and aerosols from the effluent of an industrial process before treatment of gaseous pollution. For one, aerosols would deposit and plug the conveying duct/fan system.

There are many patents that disclose methods for thermal decomposition of gaseous pollutants, but lack any teachings of solids or aerosol removal prior to decomposition. For instance, U.S. Pat. No. 4,897,528 to Anthony discloses oxidizing contaminates in an exhaust gas from a kiln in an afterburner chamber, and then filtering the oxidized effluent. This device lacks heat exchange, catalytic, packing or other media having internal flow paths that could become clogged. Thus, this patent also does not provide any guidance for solving the particulate removal problem to which the invention is directed. U.S. Pat. No. 3,509,834 to Rosenberg, et. al, and U.S. Pat. No. 4,280,416 to Edgerton disclose thermal regeneration apparatus for oxidizing gaseous pollutants in which rotatable wheels are used for preheating the effluent and recovering heat therefrom. However, both these patents lack any teaching of the need for solids or aerosol removal prior to gaseous pollution treatment.

There are also patents that disclose removal of gaseous contaminants from a gas stream by means other than thermal decomposition. One such method uses adsorption or absorption of the contaminants in which the adsorbing or absorbing material is continuously regenerated. For example, U.S. Pat. No. 4,778,492 to Dawson discloses a rotatable drum having adsorbent material for adsorbing particular components of a gas stream. As the drum rotates, a portion of the filter media is passed through a liquid regenerating material that desorbs these particular collected components from the adsorbent material into a liquid flow stream. Another gas treatment device is shown in U.S. Pat. No. 3,183,649 to Teller, which discloses an apparatus for the separation of solvent vapors from noxious gases having a rotatable filter that is chemically desorbed using steam directed to one portion of the media. In addition to the failure to teach particulate removal prior to gaseous treatment, these patents use a regeneration step that disadvantageously produces another waste stream necessitating additional recovery equipment.

The foregoing demonstrates that there is a need for an efficient filtration system for removing solid and aerosol waste materials like particles and tars from the effluent of an industrial process before it is treated by a pollution control device in which the filtration system also regenerates the filter media without creating additional disposal problems and provides for essentially uninterrupted operation of the effluent-generating process.

SUMMARY OF THE INVENTION

The invention satisfies this need and avoids the drawbacks of the prior art by providing a rotating pack bed filter having a filter media with one or more sections that collect solids and aerosols by impaction while another separate section is simultaneously regenerated, e.g., by heating and cleaning. The invention thus provides for essentially continuous separation of widely varying types of solids and aerosols from a gaseous effluent without requiring interruption of the industrial process generating the effluent.

More specifically, the invention provides a method and apparatus for conditioning effluent from an industrial process prior to treatment of the gaseous pollutants in the effluent by a thermal oxidizer, catalytic oxidizer, scrubber, or other traditional pollution control devices. The apparatus of the invention may include a housing having an effluent inlet and an effluent outlet and an impaction filter having filter media for removing solids and aerosols from the effluent. The impaction filter divides the housing into an inlet filter chamber disposed upstream of the filter and in flow communication with the effluent inlet and an outlet filter chamber disposed downstream of the filter and in flow communication with the effluent outlet. The inlet and outlet filter chambers together define a filtration zone. A regeneration system is provided for removing solids and aerosols from one portion of the filter media while another distinct portion of the filter media removes solids and aerosols from the effluent. The regeneration system includes a regeneration zone disposed in the housing and sealed from the filtration zone. The filter media is divided into segments periodically subject to filtration in the filtration zone and regeneration in the regeneration zone by means for effecting relative rotation between the filter media and the filtration and regeneration zones. Such means may be a rotatable filter support mounted in the housing. The regeneration zone may include a heating zone for raising the temperature of the filter media to a level sufficient to decompose the solids and aerosols trapped in the filter media and to vaporize and remove organic pollutants carried by the solids and aerosols, and a cleaning zone for removing the solids and aerosols from the filter media. Additionally, ductwork may be connected between the heating zone and the downstream pollution control device(s) for conducting volatiles driven off in the heating zone to the downstream device for treatment with the filtered effluent.

DETAILED DESCRIPTION

Figure 1:
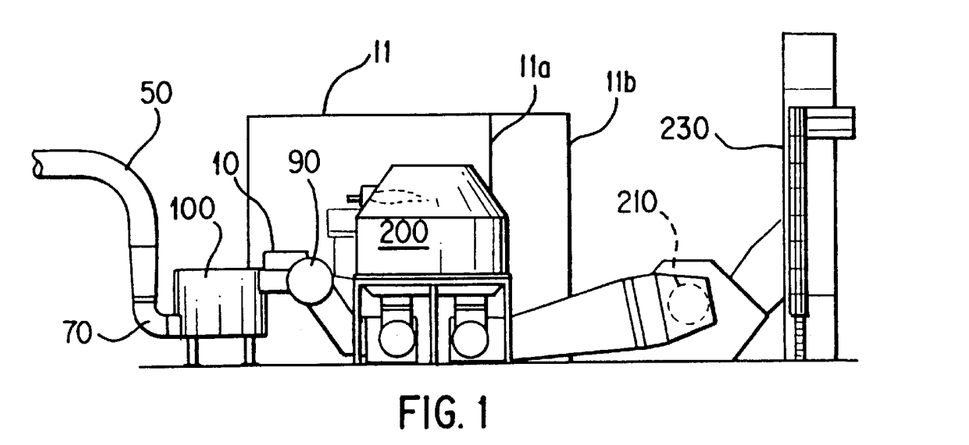
FIG. 1 is an elevational view showing a rotating pack bed filter constructed according to the principles of the invention and disposed upstream of a pollution control device for filtering the effluent of an industrial process prior to treatment in the downstream device.

FIG. 1 shows the rotating pack bed filter 100 of the invention installed upstream of a pollution control device 200 for filtering solids and aerosols from the exhaust gas from an industrial process, e.g., a wood processing plant, referred to herein as effluent. The effluent from such a process typically contains a wide variety of disparate pollutants such as solids and aerosols like particulates and tars, and organic vapors like VOC's, which may be carried by the solids and aerosols. The effluent may be conducted through exhaust piping 50 of the industrial process and a feed elbow 70 to the rotating pack bed filter 100. After the rotating pack bed filter 100 removes the solids and aerosols by impaction as described below, the effluent may be conducted to an inlet manifold 90 for distribution from more than one rotating pack bed filter 100 to one or more pollution control devices 200. One type of pollution control device that may be used with the invention is a regenerative thermal oxidizer ("RTO"). An RTO decomposes harmful pollutants from the effluent, such as VOC's, by energy efficient, high temperature oxidation in which heat is recovered using one or more regenerative heat exchange beds. One particularly advantageous RTO design that may be used with the invention is described in the assignee's U.S. Pat. No. 5,221,522 to Cash, the disclosure of which is incorporated by reference herein. However, the invention is applicable to any thermal or catalytic oxidizer, fume incinerator, scrubber or similar pollution control device having heat exchange, catalytic, packing or other media having internal flow paths that can become clogged when used to treat effluent laden with solids or aerosols such as particulates, resins or tars. The effluent is purified in the RTO in a known manner and then discharged to the atmosphere via outlet manifold 210 and exhaust stack 230. The effluent may be conducted through the filter 100 and RTO 200 to the exhaust stack 230 in any known manner, such as by the suction of an exhaust fan disposed downstream of the RTO and upstream of the exhaust stack or by the positive pressure generated by a fan disposed upstream of the filter 100.

Figure 2:
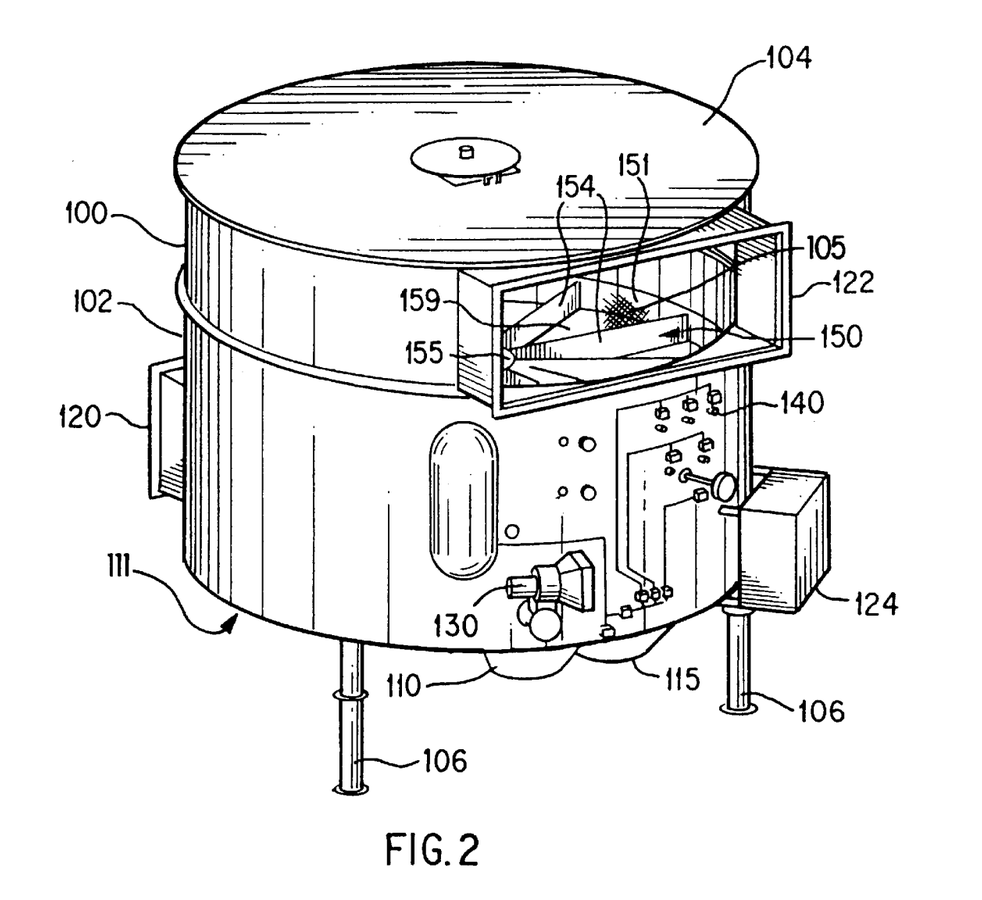
FIG. 2 is a perspective view of the rotating pack bed filter of the invention.

The rotating pack bed filter 100 collects solids and aerosols by physically separating them from the effluent in an impaction (or interception) filter. As shown in FIG. 2, the effluent enters the rotating pack bed filter 100 through inlet 120, is conducted upward through the rotating pack bed filter, which collects the solids and aerosols, and then exits the rotating pack bed filter 100 through outlet 122. The effluent may contain other pollutants such as vapors or VOC's that now may be treated by decomposition or the like in the RTO or other pollution control device without clogging the stoneware or internal flow path of the device. The particular pollution control device is selected based upon the industrial application in which the device will be employed.

Figures 3, 3A, 4:
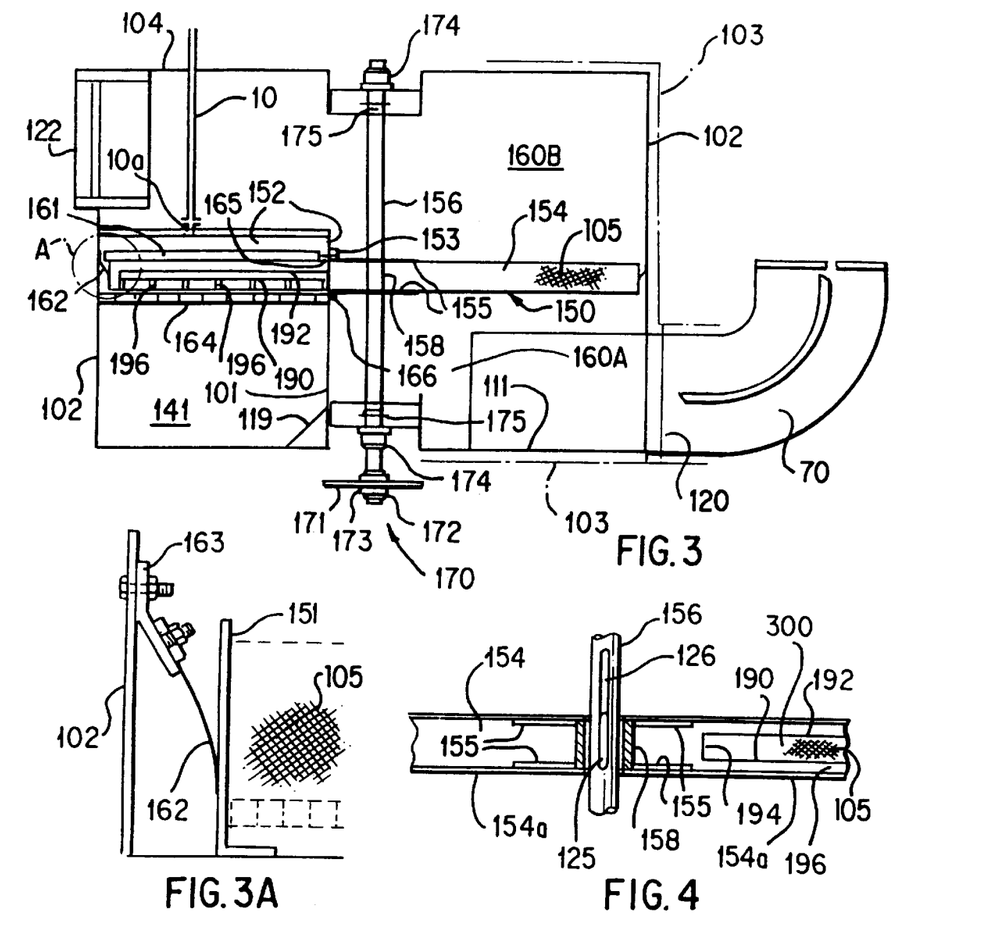
FIG. 3 is a cross sectional elevation view of the rotating pack bed filter illustrating the rotatable filter media support of the invention.
FIG. 3A is an enlarged view of a sealing arrangement that may be used at the periphery of the rotatable filter media support, as shown at section A of FIG. 3.
FIG. 4 is an enlarged sectional view of the central section of FIG. 3 illustrating one type of connection between the filter media support and the rotatable shaft.

The structure of rotating pack bed filter 100 is shown in FIGS. 2–3 within an upright cylindrical housing or shell 102. The housing 102 surrounds the outer periphery of a filter media support 150, which is supported for rotation within the shell. The housing is generally enclosed by top wall 104 above the filter support 150 and a bottom wall 111 disposed below the filter support 150. The bottom wall 111 includes the hoppers 110 and 115 FIGS. 3, 5 and 10, which are part of the heating and cleaning systems used to regenerate the filter media discussed in detail below. The lower boundary of the heating system may have any number of different configurations and need not be a hopper if material is not being collected at the bottom of this system. The exterior portions of the housing 102, top 104 and bottom wall 111 may be covered with insulation 103 (shown in phantom in FIG. 3) to prevent heat losses. FIG. 2 illustrates that housing 102 also supports the components of the heating system 130 and cleaning system 140, and a control panel 124, which may contain programmable logic for controlling the operations of the rotating pack bed filter 100. The rotating pack bed filter 100 may be elevated above ground level by suitable supports 106.

Figures 6, 7, 8, 8A:
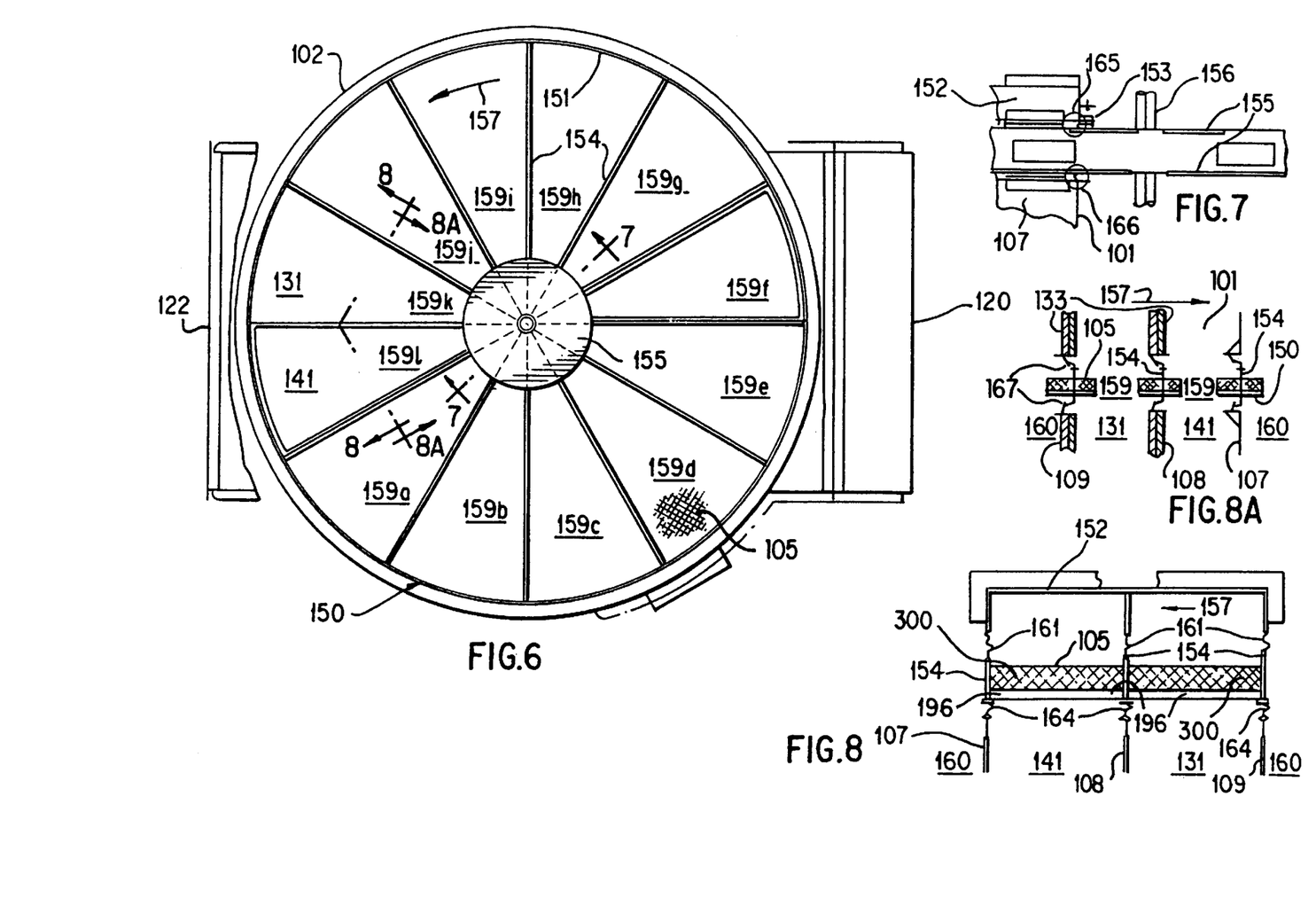
FIG. 6 is a plan view of the rotating pack bed filter illustrating the individual filter media support segments and their locations in the heating, cleaning, and filtering zones of the invention.
FIG. 7 is a schematic sectional view taken along lines 7—7 of FIG. 6 showing a filter segment sealing arrangement that may be used for isolating the cleaning zone of the invention adjacent to the rotating filter bed.
FIG. 8 is a schematic sectional view taken along lines 8—8 of FIG. 6 showing the filter segment sealing arrangement that may be used between the heating and cleaning zones.
FIG. 8A is a schematic sectional diagram illustrating an alternative filter segment sealing arrangement of the invention.
Figure 20:
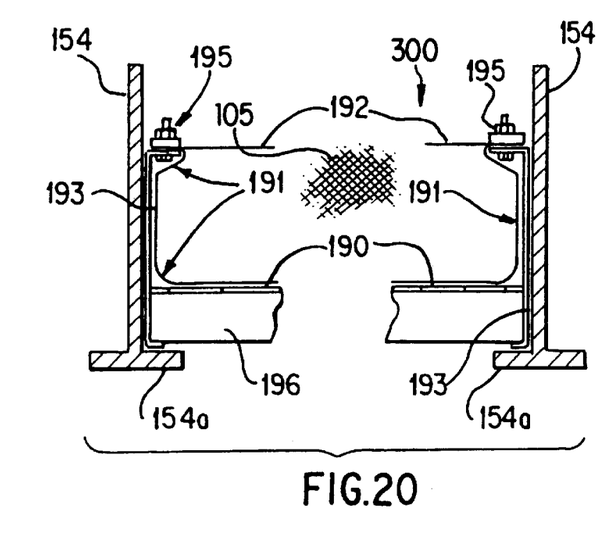
FIG. 20 is a schematic sectional view taken along lines 20—20 of FIG. 19 showing the top, bottom and supporting screens along the side portions of a filter segment.

A portion of filter media support 150, which is more clearly illustrated in FIGS. 3, 4 and 6, is visible through effluent outlet 122 in FIG. 2. The filter media support 150 may be a wheel-like structure defining individual, triangular or pie-shaped filter segments 159 within which the filter media 105 is supported and retained, for instance, by a grid support system 300 discussed below. The wheel support 150 includes an outer annular wall or rim 151 closely spaced adjacent the inner surface of housing 102 and upper and lower, inner circular plates 155 vertically spaced from each other. Spoke-like radial walls 154 extend from the inner circular plates 155 to rim 151 to divide the filter support into the filter segments 159, which are better viewed in FIG. 6. Radial walls 154 have a "t"-shaped cross section including a lower lip or flange 154a (shown best in FIG. 20) for supporting the screen enclosure 300 of each segment 159. While the filter media support 150 is shown in a horizontal position, it could be oriented in vertical or other positions.

One method of supporting the filter media 105 is by the grid support system 300 shown in FIGS. 4, 8 and 19–21, which also retains the media within the bed during cleaning. Each grid support system includes a generally pie-shaped structure that fits within each filter segment 159 and is supported by the opposed flanges 154a of adjacent walls 154. More particularly, the grid support system may include a top filter screen 192, bottom filter screen 191, bottom perforated support or grate member 190 upon which the bottom screen 191 rests, and a series of transversely extending support ribs 196 upon which the grate member 190 is placed. The grate, screens and ribs may be held together by a pair of lateral screen retainers 193 and end screen retainers 194, which extend along the outer periphery of the support system 300. (FIG. 19 only illustrates portions of the retainers 193, 194.) The support ribs 196, which may be arcuate in shape, extend between the pair of lateral retainers 193 of each enclosure 300 and are supported by lower flanges 193a of the retainers. As mentioned above, the bottom grate 190 rests upon the support ribs 196 and extends across the cross section of the enclosure 300. Both the bottom and top filter screens 191, 192 may be connected at top flanges 193b, 194b of retainers 193, 194 by suitable fasteners, such as bolts 195. Thus, the bottom screen 191 extends downwardly from the top flange 193b of one retainer 193, along the inner side of the retainer 193, across grate 190, upwardly along the inner side of the adjacent retainer (not shown in FIG. 20) to its top flange 193b where it is also secured by another set of fasteners 195. The top screen 192 extends across the top of the enclosure 300 and is also fastened to the adjacent lateral retainers at flange 193b by fasteners 195.

Figure 21:
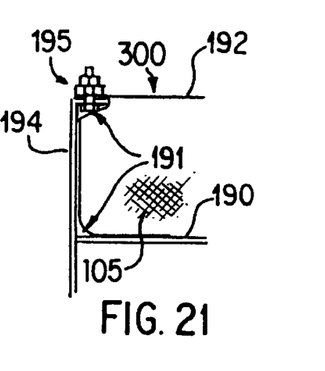
FIG. 21 is a schematic sectional view taken along lines 21—21 of FIG. 19 showing the top, bottom and supporting screens along the end portions of a filter segment.

The inner and outer ends of the system 300 are enclosed by the end screen retainers 194, which extend between the adjacent lateral retainers 193. As shown in FIG. 21, the top and bottom filter screens 191, 192 also may be secured to the end screen retainers by fasteners 195.

Figure 19:
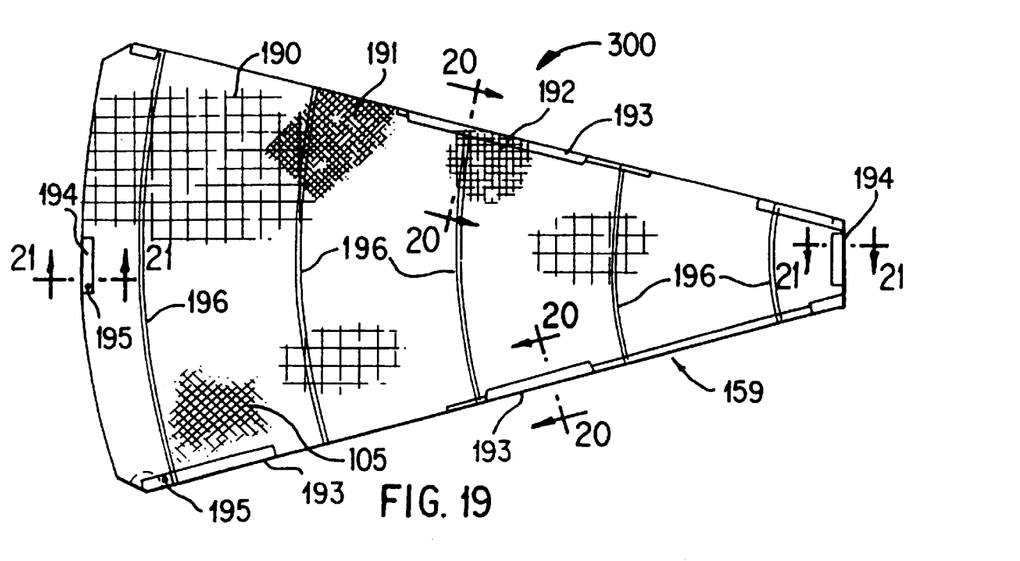
FIG. 19 is a plan view of a filter screen enclosure that may used in the rotating pack bed filter of the invention.

The bottom screen 191 may have a smaller cross sectional flow area relative to that of the perforated bottom support or grate 190, while the top screen 192 may have a cross sectional flow area smaller than the bottom grate 190 but larger than bottom screen 191. The relative sizes of these cross sectional flow areas are selected based upon design considerations known in the art that permit the filter media 105 to be retained between the top and bottom screens 191, 192, while not unduly restricting the flow of effluent therethrough. The top filter screen is particularly necessary when a free flowing material such as round pellets is used as the filter media 105 to retain it in place during cleaning of the media as is discussed below. The top filter screen is not required if the filter media consists of a self-supporting (non-free flowing) material such as a fiber blanket or mesh. The corners of filter screen enclosure may be cut or radiused as shown in FIG. 19 to avoid formation of pockets where solids and aerosols might settle and be collected.

More particularly, the media used as the impaction filter may comprise appropriately sized, e.g., ¼", ceramic pellets or spheres, packed at density providing a predetermined amount of free space, which also is determined by known design considerations. Bed performance may be enhanced by using two different types of media together separated by a suitable perforated barrier, such as a third screen. In addition, ceramic or stainless steel mesh may be used as the sole filter media, or in conjunction with another type of media. Other mechanical collectors may be used such as baffle plates, "demister" type wire or ceramic weaves. The impaction collection efficiency also may be increased by adding an electric charge to the particles and grounding the bed or by any other means known in the art.

FIG. 3 illustrates one manner of effecting rotation of the filter media in which a filter wheel 150 is supported for rotation within the housing 102 by upper and lower bearings 174. A drive mechanism 170, described in detail subsequently, then is provided for rotating the wheel support 150 through various effluent processing zones or chambers for continuously filtering the effluent and regenerating the filter media contained in the filter segments. In addition to the filter zone, which typically has the greatest volume, two other process zones sealed from the filter zone are located within housing 102 for regenerating the media. The first regeneration zone is a heating zone 131 (see, e.g., FIG. 6) for decomposing the collected solids and aerosols trapped by the filter media 105 and driving off or burning out the VOC's that may be carried by the collected solids and aerosols. The other regeneration zone is a cleaning zone 141 for removing collected solids and aerosols from the voids of the filter media 105. Of course, the filter media could be stationary and suitable structure could be provided instead for directing the treatments of each of the processing zones to each filter segment.

The filter chamber 160 of the housing 102 is divided by the rotating filter wheel 150 into an inlet filter chamber 160A disposed upstream the filter wheel and an outlet filter chamber 160B downstream of the filter wheel. Inlet filter chamber 160A and outlet filter chamber 160B together define the filter zone of the invention. Inlet chamber 160A is generally bounded by the bottom wall 111, walls 101, 107 and 109 of the heating and cleaning zones 131, 141 and the lower portion of filter wheel 150. Walls 101 and 107 are shown in FIG. 7 and walls 107 and 109 are identified in FIGS. 8 and 8A. The outlet chamber 160B is generally bounded by the top wall 104, hood 152, which seals the top portions of the heating and cleaning zones from the filter zone 160, and the upper portion of the filter wheel 150. Once the effluent enters the housing, it is conducted from inlet chamber 160A upward through the filter media and to outlet chamber 160B. The inlet and outlet filter chambers 160A, 160B are sealed at the periphery of filter wheel 150 as illustrated in FIG. 3 to prevent effluent from bypassing the filter. FIG. 3A shows an enlargement of one method of providing this sealing arrangement. Angled support 163 is attached to the inner cylindrical surface of housing 102. The upper portion of leaf seal 162 is attached to angled support 163 and the lower portion of leaf seal 162 flexibly engages the periphery support structure 151 of filter media support 150 to seal the gap between the housing 102 and the annular rim 151 of the filter media support 150. The flexible leaf seal 162 may be formed from metal strips, such as stainless steel or other materials capable of withstanding the high temperature (e.g., 1400° F.) and other conditions, e.g., exposure to corrosive material that may be present in the effluent. The strips may be overlapped and connected in any known manner to form a continuous flexible seal 162.

The effluent processing zones described above are sealed from each other and in fluid communication with different portions of the rotating pack bed filter at any given time during operation. In the illustrated embodiment, at any one time ten filter segments, e.g., 159a–159j, are in the filter zone 160 while two filter segments, e.g., 159k and 159l, are in heating zone 131 and cleaning zone 141, respectively. (See FIG. 6.) Therefore, a single revolution of the filter media support 150 in the direction of arrow 157 represents twelve operational cycles. For example, filter segment 159a may spend ten cycles in the filter zone 160, one cycle in the heating zone 131 and one cycle in the cleaning zone 141. The precise size and number of filter segments and processing zones, as well as the retention time in a particular zone, may be varied based on the particular application and design considerations including the process operating conditions, the efficiency of the filter media, and characteristics specific to the regeneration of the media. In addition, the heating and cleaning zones may be operated at timed intervals dependent upon the operating variables, discussed in more detail below.

Figure 9A:
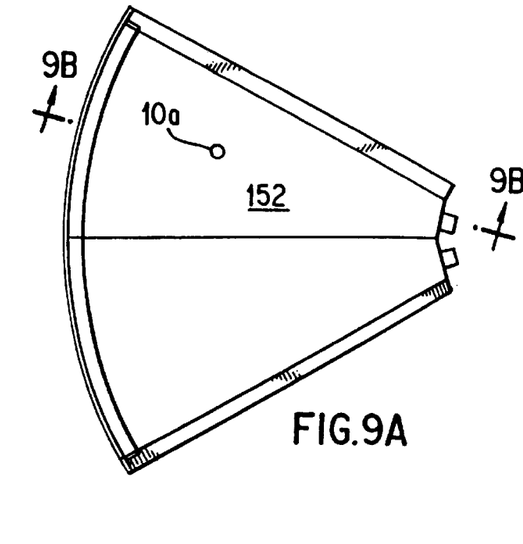
FIG. 9A is a plan view of a hood arrangement located above the heating and cleaning filter segment zones for preventing the ingress of the effluent into these zones.

The heating zone 131 is provided primarily to reduce the collected solids and aerosols to ash and to eliminate any gaseous pollutants (typically VOC's) that may be carried by the solid matter in the effluent, thus reducing the volume of the particulate. At such high temperatures, moisture in the particulate and/or tars also will be driven off in the heating zone, thereby leaving a dust residue. Accordingly, a vent 10a is provided in the heating zone portion of hood 152 (FIG. 9A) for conducting the volatiles driven off in the heating zone 131 via line 10 (shown schematically in FIG. 1) to a pollution control device 200 for treatment with the filtered effluent. The vent may have a variable flow area provided by an adjustable orifice or the like. Specifically, the heating zone 131 is defined in housing 102 by the hood 152, inner wall 101, common heating/cleaning zone wall 108, wall 109 (see FIGS. 8 and 8A), and the heating hopper 110 (see FIG. 2). Additionally heating zone insulation 133 may be provided on the heating zone wall 109 and common wall 108 to prevent heat losses, as shown schematically in FIG. 8A. The heating system 130, which carries out the heating operation is described in greater detail below.

Figure 5:
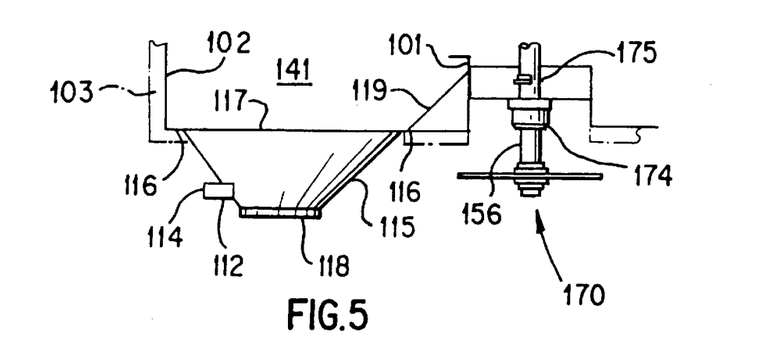
FIG. 5 is a sectional elevation view illustrating use of a collection hopper at the underside of the filter housing of FIG. 3.

The cleaning zone 141 is provided to remove the solid and aerosol material captured by the filter media, including any residue remaining from the decomposed particulates, tars, and the like generated in the heating zone 131. These materials are effectively removed from the filter media by one or more known methods such as fluidization, e.g., using gas pressure, described in more detail below. Cleaning zone 141 is generally illustrated on the left hand side of FIG. 3 and is confined in housing 102 by the hood 152, inner wall 101, wall 107, common wall 108 (see FIGS. 8 and 8A), and the cleaning hopper 115, FIG. 5 shows cleaning hopper 115 attached to the lower portion of cleaning zone 141. (Heating hopper 110 and heating zone 131 are not shown in FIG. 5 but may be similarly constructed.) The top of the hopper has an opening 117 generally conforming to the shape of a filter bed segment and progressively narrowing towards a circular lower opening 118. A lip 116 surrounds the periphery of the upper opening 117 for fixedly attaching the hopper to the bottom 103 of the housing 102 below the cleaning zone 141. The hoppers, especially cleaning hopper 115, collect any material removed from the filter media. Both the heating and cleaning hoppers may be equipped with a nozzle opening 112 having a removable cap 114 to facilitate inspection or product removal. The cleaning system 140, which carries out the cleaning operation also is described in greater detail below.

Figure 9B:
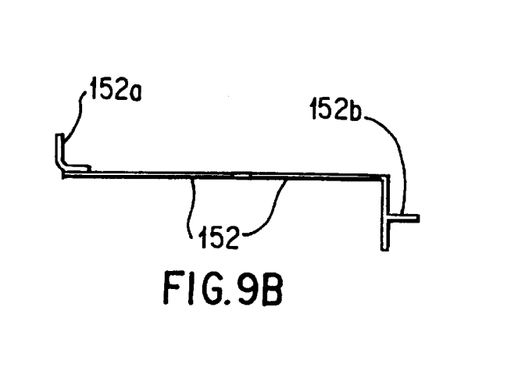
FIG. 9B is a sectional view taken along lines 9B—9B of FIG. 9A showing the cross section of the hood.

To achieve the maximum benefits of the invention, the filtering, heating and cleaning operations should proceed simultaneously to enable essentially continuous filtration. Therefore, appropriate sealing arrangements are used to keep the flow streams between these operating zones separated. Part of the sealing between the filtration zone and the heating and cleaning zones may include the hood 152 attached to the housing above the rotating pack bed filter. Thus, hood 152, shown in plan view in FIG. 9A, forms the top of the heating and cleaning zones. The cross sectional shape of hood 152 is shown in FIG. 9B. The upper portion of hood 152 has a curved angular lip 152a, which extends along the outer radius of the hood 152 and is attached to an inner wall portion of housing 102. The lower portion of hood 152 has a projection 152b, which is connected to a rolling hood support 153 shown best in FIG. 7. As the pack bed filter is rotated, the hood 152 remains stationary as the rolling support 153 rides upon the upper circular plate 155 of wheel 150.

FIGS. 3 and 7 show how the radially inner portion of the hood 152 is sealed by a top inner seal 165 to the upper inner circular plate 155. Seal 165 may comprise a leaf spring having folds or hinges formed of metal or other suitable, flexible material for providing the required seal between these relatively movable parts. Bottom inner seal 166, which forms the seal between the inner wall 101 of the heating and cleaning zones 131, 141 and the lower inner circular plate 155, may be similarly constructed.

FIGS. 3 and 8 illustrate radial spoke seals 161, 164, which extend parallel along the radial walls or spokes 154 of filter wheel 150. Radial spoke seals 161, 164 are required to isolate the heating and cleaning zones 131, 141 from each other and the filter zone 160. FIGS. 3 and 8 show one type of upper spoke seals 161, which seal the hood 152 to the upper portion of the spokes 154 disposed below the hood, and lower spoke seals 164, which seal cleaning zone wall 107, common wall 108, and heating zone wall 109 to the lower portion of the spokes 154. Spoke seals 161, 164 may be formed from folded or hinged metallic leaf springs or other suitable flexible material fixedly attached to the stationary hood 152 in the case of seals 161 or to the zone walls 107–109 in the case of seals 164. In this illustrated embodiment, the filter wheel 150 would be rotated periodically in a step-wise fashion one segment at a time by a drive mechanism, such as that shown in FIGS. 14–18. The sealing contact between the seals 161, 164 and the spoke walls 154 is broken during the periodic rotation. Alternatively, the wheel 150 could be rotated continuously during operation by any conventional drive mechanism. In this case, the filter media would be filled completely to the top or just over the top of the walls 154. The spoke seals 161, 164 then continuously abut and seal against the filter media itself throughout operation and rotation of the wheel. In this embodiment, the individual filter segments and spokes could be replaced by a single, homogenous filter media and support system. FIG. 8A illustrates a further, alternative sealing arrangement for the step-wise mode of operation in which the seals 167 are attached to upper and lower portions of the rotating spokes 154 rather than to the hood 152 and zone walls 107–109 as in FIG. 8.

The purpose of the seal arrangements discussed above is to isolate the filter media disposed in the various zones from each other. No matter what type of sealing arrangement is used, there is going to be a small amount of gas leakage between zones. In general, any leakage across the zones should be inconsequential. The primary leakage concern is preventing unfiltered effluent from bypassing the filter media. This is prevented throughout operation by the peripheral seal 162. Leakage between the zones occurring, for instance, during the step-wise rotation mode of operation of wheel 150, could allow the VOC's driven off in the heating zone to bypass vent 10a and the conduit 10 for conducting the VOC's to the downstream device for proper treatment. If the amount of such VOC's leaking and bypassing proper treatment is of concern, the relative pressure between the various zones may be controlled by conventional means in the art to create a differential pressure directing the leakage into a desired collection area. For example, any leakage between zones may be directed into the heating zone and conducted via line 10 to the pollution control device. The leakage may be filtered (outside of the pack bed filter) before being transferred to the pollution control device.

Alternatively, the leakage may be recycled by conducting it upstream of the rotating pack bed filter. Thus, as long as the leakage is small and/or properly directed, the filtering operation may be continuous even if the zones are not sealed during rotation of the wheel.

The central portion of FIG. 3 illustrates part of one driving mechanism 170 that may be used for rotating the filter wheel 150. Although the illustrated embodiment depicts a step-wise mode of operation, the rotating pack bed filter alternatively can be driven in a continuous manner by any conventional means known in the art. The seal arrangement then would be modified as discussed above. A central shaft 156 is supported for rotation at the top and bottom of housing 102 by suitable bearings 174 and packing glands 175, which operate in a manner known in the art to fix the shaft axially and permit rotation about its longitudinal axis. Located in a middle portion of the central shaft 156 is a support hub 158 for connecting the wheel 150 to the shaft 156 for rotation therewith. The connection of the support hub 158 to the wheel 150 and shaft 156 is better illustrated in FIG. 4. Hub 156 may be fixedly attached to the circular plates 155 by welding or other known means. The central shaft 156 is coupled to hub 158 through the use of one or more keys 125 and keyways 126 (only one such combination is shown) in a manner well known in the art. Any other known coupling may be used to connect the shaft to the filter support wheel 150. Of course, the illustrated filter support wheel and driving mechanism 170 is only one of any number of suitable structures that may be employed to move the media through the filtering and regeneration zones.

Figure 15:
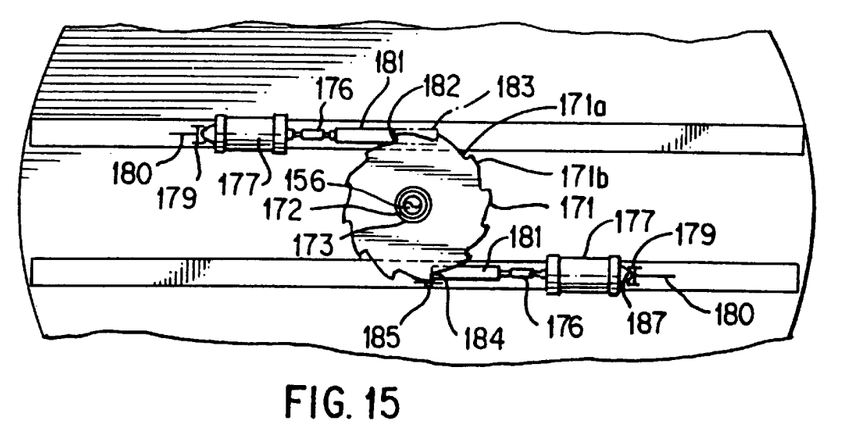
FIG. 15 is a plan view of the drive mechanism shown in FIG. 14.
Figure 16:
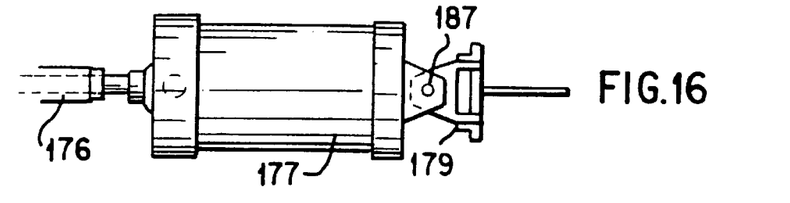
FIGS. 16 and 17 are plan views of one of the pivoting cylinders and associated hardware of the drive mechanism shown in FIG. 14.
Figure 17:
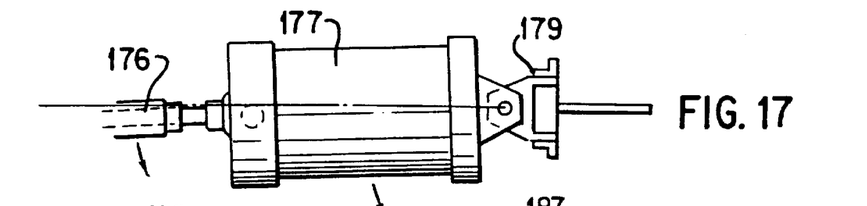
Figure 18:
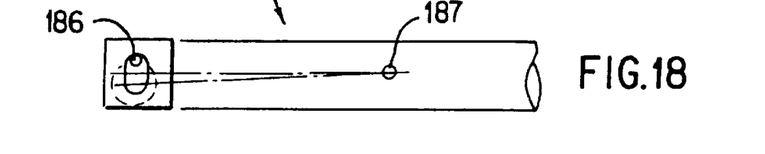
FIG. 18 is a plan view of a cylinder hanger support that permits pivoting of the cylinder drive mechanism shown in FIG. 15.

The details of the illustrated drive mechanism for rotating the shaft 156 and wheel 150 are shown in FIGS. 14–18. The central shaft 156 projects through the bottom wall 111 of housing 102 and carries a collar 172, which is coupled to a rotor 171 by hub member 173. Rotor 171 has a plurality of notches 171a formed between projections 171b disposed about its outer circumference. The notches 171a are designed to receive a driving rod or the like for rotating the rotor 171 and attached shaft. More particularly, FIG. 15 shows two of the notches being engaged with a pair of pin 182 and clevis 181 arrangements, each of which is driven by a piston rod of a cylinder 177 connected to the clevis by a coupling 176. The pin and clevis 182, 181 of the cylinders 177 may be diametrically opposed about the notched rotor 171. Each cylinder 177 is mounted below the housing 102 by cylinder hanger 178 and cylinder support 180, which are connected at opposite ends of the cylinder. Each cylinder support 180 has a bracket 179, which is coupled with the base of cylinder 177 by a pivot pin 187. FIG. 18 illustrates the cylinder hanger 178 in detail and shows a slotted hole 186 and bolt connection, which allows the cylinders 177 to pivot transversely about their respective pivot pins 187 when operated to rotate the notched rotor, as described below.

The lower cylinder in FIG. 15 is shown in a fully retracted position 184 in which pin 182 is fully engaged in a notch 171a. As the piston rod is extended it moves in a lateral direction which includes a slight amount of pivoting about pin 187. The attached clevis and pin 181, 182 pushes the notch rotor until the piston rod is in its fully extended position shown in phantom at 183. FIG. 15 also illustrates the partially retracted, pivoted position 185 of the cylinder 177, which allows the pin 182 to pivot out of its notch 171a, around projection 171b, and to return to its retracted position with the pin being engaged in the circumferentially, successive notch. A conventional resilient structure, such as a bracket/spring arrangement, is connected to each cylinder 177 for constantly urging the pin 182 against the circumference of the rotor 171. The spring structure (not shown for purposes of clarity) thus provides a force for biasing the pin 182 into the successive notch.

FIG. 15 shows how the drive mechanism rotates the filter wheel in a step-wise manner. One extension of the piston rods from the pair of cylinders 177, when simultaneously operated by fluid pressure in a known manner, rotates the pack bed filter through $\frac{1}{12}$ of an operational cycle or 30 degrees. The number (n) of notches 171a in rotor 171 is equal to the number of filter segments 159 provided in wheel 150, e.g., n=12 in the illustrated embodiment, such that the driving mechanism rotates the wheel 360°/n, e.g. 30°, during each operational cycle. The cylinders 177 are controlled and operated by suitable valves and control logic well known in the art, which may provided in a control panel 124 attached to the housing 102 as shown in FIG. 2, to periodically rotate successive filter segments 159 into the filter zone 160, heating zone 131 and cleaning zone 141. Of course, a single cylinder, multiples of cylinders other than the illustrated pair, or other known means such as an electric motor may be used to rotate the filter segments.

The filter segments are rotated through the zones to provide for essentially continuous filtration and regeneration of the filter media. In this particular industrial application the filter media is regenerated in the following two-step manner. First, the solid and aerosol material trapped in the voids of the filter media are subject to high temperature in the heating zone, which drives off volatiles like VOC's and converts the materials to a residue. Second, the residue is removed from the void spaces in the cleaning zone with a high pressure fluid. Additional cleaning devices including one or more vibrators, rappers or acoustic fluidizers (horns) may be used alone or in combination to remove the residue. These operations preferably are performed on only a small portion of the media at a time so that the other portions continue to filter the effluent. Thus, a system shutdown for the purpose of regenerating the filter is not required.

Figure 10:
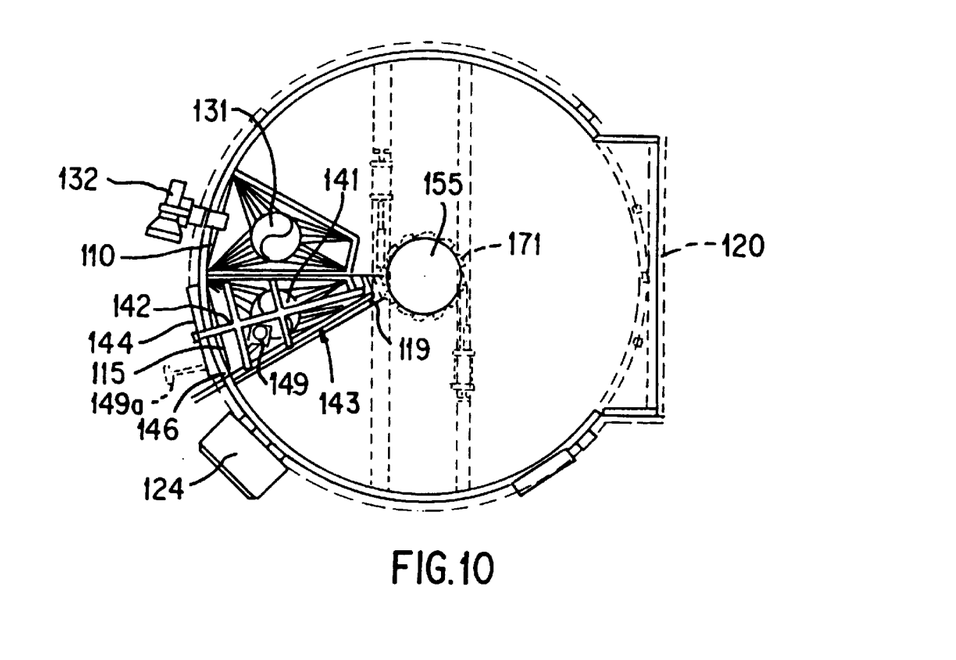
FIG. 10 is a plan view of the rotating pack bed filter taken beneath the filter media support of FIG. 6 illustrating the heating and cleaning systems of the invention.

FIG. 10 shows one type of structure for the heating and cleaning systems 130, 140 provided in zones 131 and 141. As mentioned above, the bottom of the cleaning zone may be provided with a hopper 115, which has inwardly and downwardly sloping surfaces (see also FIG. 2) for collecting any residue removed from the filter media. A hopper 110 also may be provided below the heating zone 131, if materials are to be collected in the heating zone as well. A natural gas burner 132, provided with suitable controls, may be provided in communication with the interior of the heating zone 131 to raise and maintain the temperature therein to a level sufficient to decompose the solids and aerosols and to drive off any VOC's or other harmful volatiles carried by the solids and aerosols trapped in the filter media segment disposed in the heating zone. Of course, other known heating means such as electric heating burners, electric heating coils, etc. may be used to heat zone 131 to the required bake-out temperature, typically in the range of 600°–1500° F., which is high enough to convert the particles and tars in the media to a dust residue. When the invention is used in conjunction with a thermal oxidizer, incinerator or other high temperature pollution control device, instead of using an external heating device, a portion of the high temperature purified effluent from the pollution control device may be conducted back into the heating zone 131 to raise the temperature to the required bake-out level. This is shown schematically in FIG. 1 by lines 11, 11a or 11, 11b, which would contain suitable valving and the like. As discussed previously, the VOC-laden exhaust gas stream generated in the heating zone may be bled back into the filtered effluent by vent 10a (FIG. 9A), suitable ductwork and valving (schematically shown by line 10 in FIGS. 1) for treatment in the pollution control device 200, while the residue remains in the filter media.

The removal of solids, aerosols, and residue from the bake-out step from the voids in the filter media is carried out in the cleaning zone by directing sonic pulse waves and/or pressurized fluid into the media. The fluid may have a pressure large enough to fluidize the filter media. However, complete fluidization such that the filter media floats may not be necessary to effectively clean the filter media. The pressurized fluid, such as air, nitrogen or the like, may be introduced through the use of one or more nozzle structures disposed above and/or below the filter media. Vibrators, rappers or acoustic fluidizers (horns) may be used alone or in combination with the nozzles. FIG. 10 illustrates several different nozzle structures and cleaning devices, which again may be utilized alone or in some combination with the other devices depending on the particular application. Specifically, FIG. 10 shows top and bottom nozzle structures 142, 143 and sonic horn 149. Sonic horn 149 may be vertically disposed in the cleaning zone or horizontally as shown at 149a. Top nozzle 142 is supported in the cleaning zone above the filter wheel support 150 by an attachment plate 144 fixed to housing 102. The bottom nozzle 143 is supported below the wheel 150 by an attachment plate 146 also fixed to the housing. Only one or both of the nozzle structures may be provided. The structure of the nozzles is shown in FIGS. 11–13 described in more detail below.

Figure 11A:
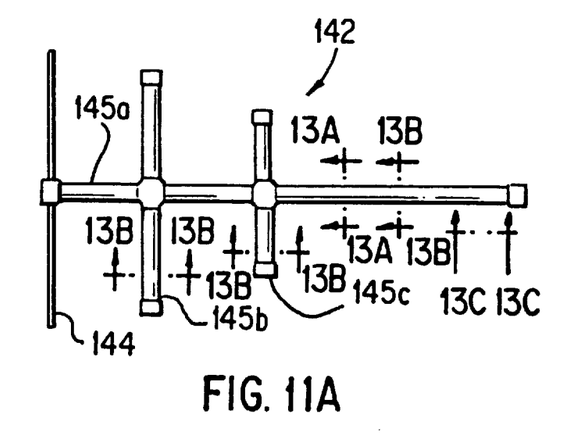
FIGS. 11A and 11B are plan and elevational side views, respectively, of a top nozzle structure that may be provided with the cleaning system shown in FIG. 10.
Figure 11B:
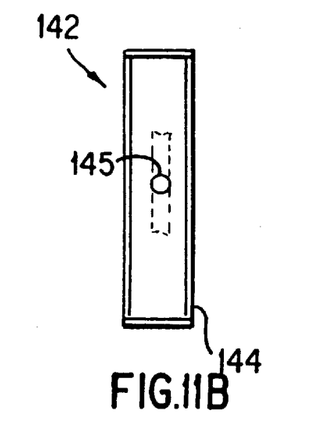

FIG. 11A shows top nozzle 142, which includes longitudinal piping 145a having a central passage therethrough and cross pipe members 145b and 145c communicating therewith. Spray nozzles 148 are attached to the underside of the pipes 145, and may be disposed in one or more of the various orientations shown in FIGS. 13A–C for conducting pressurized fluid from a source (not shown) downwardly to substantially all areas of the filter media segment disposed in the cleaning zone. The particular configuration of the top nozzle structure 142 is dependent on the shape of the cleaning zone 141, which is designed to conform to the generally triangular shape of the filter segments. Therefore, the piping 145 also is designed in a triangular manner to aid in uniformly directing fluid to the filter media segment. Of course, other shapes could be used as well.

Figures 12A, 12B:
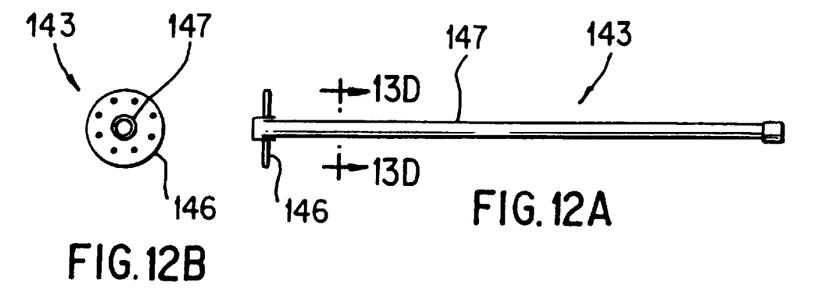
FIGS. 12A and 12B are plan and elevational side views, respectively, of a bottom nozzle structure that may be provided with the cleaning system shown in FIG. 10.

The bottom nozzle 143, which may be used alone or in combination with the top nozzle or horn(s), is shown in FIGS. 12A–B and may include a single pipe 147 secured below the filter segment disposed in the cleaning zone by the attachment plate 146 (see FIG. 10). Piping 147 has a plurality of spray nozzles 148 (shown as a schematic sectional view in FIG. 13D) attached to the top of piping 147 for directing the fluid, e.g., gas, upwardly through the filter segment. The media may thereby be "fluidized" such that it floats and therefore must be retained in the filter bed by top screen 192.

Figure 13A:
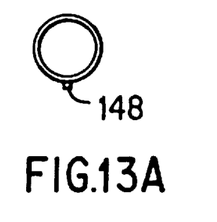
FIGS. 13A–13D are views taken along the correspondingly designated lines in FIGS. 11 and 12, which show individual spray nozzles that may be provided on the top and bottom nozzle structures.
Figure 13B:
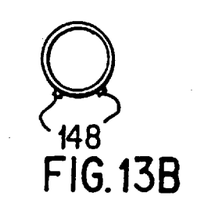
Figure 13C:
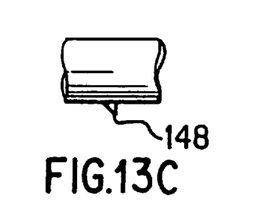
Figure 13D:
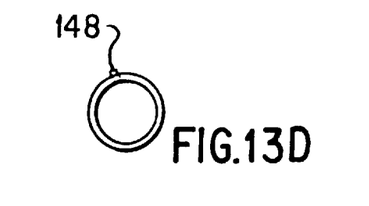
Figure 14:
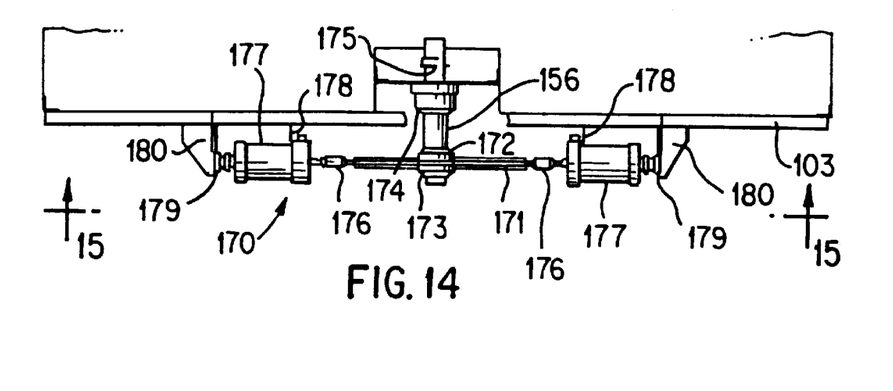
FIG. 14 is an elevational view more clearly showing a drive mechanism that may be employed to rotate the pack bed filter of the invention.

The location, angle and number of the spray nozzles are determined by design considerations well known in the art. Use of alternating single and double spray nozzles as shown in FIGS. 13A–B may be employed along the piping structures to provide for a more uniform cleaning of the bed filter media. While the invention advantageously allows for the cleaning of the filter media without the introduction of water and/or steam, for particular applications water and/or steam may be desirable and used as the cleaning fluid in the invention. For example, water would be an effective cleaning fluid in an application where the collected material created a significant dust problem yet was non-toxic and water soluble, such as particulate dyes used in ink manufacture. Additionally, other cleaning fluids, such as solvents, may be useful where the collected material strongly adheres to the filter media.

After the fluid pressure and/or sonic waves are generated in the cleaning zone, the dislodged material may then be collected at the bottom of the cleaning hopper 115. A suitable damper may be provided in the cleaning zone 141 for selectively permitting collected materials to fall into the cleaning hopper 115. As shown in FIG. 5, one or more diagonal plates 119 may be provided in the zone 141 to help conduct the collected materials into the hopper 115 and ensure that there are no dead spaces where material may buildup. Because the harmful gases like VOC's have been driven off and fed back into the effluent for treatment in the downstream pollution control device, no additional treatment of the collected materials is necessary before disposal. After the collected materials are removed from the filter media present in the cleaning zone, the filter segment may rotated back into the filter zone 160 where it will again remove solids and aerosols from the effluent. The fluid pressure used to clean media also may be recirculated back into the effluent upstream of the filter or upstream of the pollution control device to ensure that all of the gaseous pollutants are properly treated.

The heating and cleaning operations of the invention constitute an automatic particulate removal system that functions without having to interrupt the process flow. The timing and duration of the periodic bake-outs in the heating zone and the collected material removal in the cleaning zone depends upon numerous design and operating conditions unique to any particular application, which are readily apparent to one of ordinary skill in the art. Such conditions include, but are not limited to, effluent gas volume relative to the specific filter size/configuration, concentration and characteristics of the incoming material being collected, peripheral equipment capacities (fan pressures, etc.) and the like. In a typical wood processing environment in which a step-wise filter rotation is used, the heating zone may be operated to bake-out a different filter segment once per each revolution of the filter wheel, while the cleaning operations may be carried out before each rotation of the filter wheel. The automatic particulate removal system of the invention does not require the use of water or similar fluids that can produce steam or vapor when heated and accelerate corrosion. However, access ports may be provided for periodic manual washing of the packing trays and internals. This washing procedure may be accomplished without entering the unit.

In addition, any number of additional operations may be performed on the effluent and/or filter media by appropriate separation of the flow streams in the housing 102. Examples of such operations are cooling of the filter media, providing separate filter zones for removal of different types or sizes of particles, and multiple fluid treatments of the filter media with the same or different fluids.

The driving, heating and cleaning mechanisms may be automatically controlled by a computer or microprocessor programmed to accept input conditions and to control the rotation of the bed in a timed sequence, the temperature of the heating zone, the gas flow to the cleaning zone, as well as the blast from the sonic horn(s) and other operations. The computer may be housed at a remote location or in the control panel 124, which also may contain suitable circuitry for monitoring process conditions, input values, and overriding the computer control.

What is claimed is:

1. Apparatus for conditioning effluent from an industrial process, said apparatus comprising:
   (a) a housing having an effluent inlet and an effluent outlet;
   (b) an impaction filter in the housing having filter media for removing solids and aerosols if any are present in the effluent, said impaction filter dividing the housing into an inlet filter chamber disposed upstream of the filter and in flow communication with the effluent inlet and an outlet filter chamber disposed downstream of the filter and in flow communication with the effluent outlet, said inlet and outlet filter chambers together defining a filtration zone; and
   (c) a regeneration system for decomposing and removing solids and aerosols in the impaction filter by subjecting one portion of the filter media to a temperature in a range from about 600° F. to about 1500° F. while another separate portion of the media continues to filter the effluent, said regeneration system including a regeneration zone disposed in the housing and seals isolating both the inlet and outlet filter chambers defining the filtration zone from the regeneration zone.

2. The apparatus of claim 1, wherein said separate portions of the filter media are periodically subject to filtration in the filtration zone and regeneration in the regeneration zone by means for effecting relative rotation between the filter media and the filtration and regeneration zones.

3. The apparatus of claim 1, wherein said impaction filter divides the regeneration zone into sealed regeneration chambers, with one of said regeneration chambers being disposed on the upstream side of the filter and the other of said regeneration chambers being disposed on the downstream side of said impaction filter, and further comprising means for allowing application of a regenerating substance to said impaction filter from both of said regeneration chambers.

4. The apparatus of claim 3, wherein said allowing means comprises a source of pressurized fluid and a set of nozzles disposed in both of said regeneration chambers, said nozzles being in selective fluid communication with said source of pressurized fluid, and said regenerating substance comprises pressurized fluid from said source.

5. The apparatus of claim 1, wherein said impaction filter comprises a support structure having a longitudinal axis about which said support structure is mounted for rotation, and wherein effluent in the filtration zone is conducted through said impaction filter in an axial direction generally parallel to the longitudinal axis of said impaction filter, whereby solids and aerosols in the effluent conducted towards the support structure fall away from the impaction filter due to gravity.

6. The apparatus of claim 1, further comprising means for supporting said impaction filter for rotation relative to the filtration and regeneration zones independent of said seals isolating the regeneration zone from the inlet and outlet filter chambers.

7. The apparatus of claim 2, wherein said regeneration zone includes a heating zone including means for raising the temperature of the filter media to a level sufficient to decompose solids and aerosols if any are trapped in the filter media to a residue and a cleaning zone including means for removing the residue from the filter media.

8. The apparatus of claim 7, wherein said heating and cleaning zones are disposed inside said housing and are sealed from each other and the filtration zone.

9. The apparatus of claim 7, wherein said heating zone further comprises a source of heat for raising the temperature of the filter media therein to the required bake-out level.

10. The apparatus of claim 9, wherein said heat source comprises purified effluent conducted from an oxidizer disposed downstream of the impaction filter for thermally decomposing gaseous pollutants in the effluent to the heating zone.

11. The apparatus of claim 7, wherein said cleaning zone further comprises:
   a source of pressurized fluid; and
   one or more nozzles disposed in the cleaning zone in selective fluid communication with said source of pressurized fluid for uniformly directing pressurized fluid into the portion of the filter media disposed in the cleaning zone to remove residue from therein.

12. The apparatus of claim 7, wherein said cleaning zone further comprises a sonic horn for directing sonic waves into the portion of the filter media disposed in the cleaning zone to remove residue from therein.

13. The apparatus of claim 8, wherein said impaction filter is supported within said housing for rotation relative to the filtration and regeneration zones.

14. The apparatus of claim 13, further comprising a downstream device for treating gaseous pollutants and ductwork connected between the heating zone and the downstream device for conducting gaseous pollutants driven off in the heating zone to the downstream device for treatment.

15. The apparatus of claim 14, wherein said downstream device comprises a thermal oxidizer having an inlet in flow communication with the effluent outlet for thermally decomposing gaseous pollutants in the effluent, said oxidizer including at least one bed containing heat transfer media.

16. The apparatus of claim 13, further comprising:
   a rotatable filter media support having a central portion and a peripheral portion, said central portion being coupled to a shaft mounted for rotational movement;
   said filter media support including a plurality of radial walls extending from said central portion to said peripheral portion, said radial walls dividing said filter media into a plurality of filter segments.

17. The apparatus of claim 16, further comprising:
   upper and lower seals operatively coupled with the filter segments for fluidically isolating the filtration, heating and cleaning zones;
   a peripheral seal disposed between the filter media support and the housing to seal a clearance gap formed therebetween; and
   an enclosure forming an upper boundary of said regeneration zone, said enclosure having a first portion fixedly attached to said housing and a second portion connected to a rolling support permitting rotation of said filter media support relative to said enclosure.

18. The apparatus of claim 16 wherein said means for effecting relative rotation comprises:
   a notched rotor fixed to one portion of said rotatable shaft; and
   a cylinder having a piston rod engageable with said notched rotor and being supported from said housing for pivotal movement during at least one of the extension and retraction movements of said piston rod, wherein operation of said cylinder forces said piston rod into engagement with the notched rotor to rotate the shaft and filter support a predetermined amount.

19. The rotational filter system of claim 16 wherein each filter segment further comprises an enclosure for retaining the filter media within each filter segment, said enclosure being supported by the radial walls and including ribs extending transversely across the filter segment, a bottom perforated member supported by said ribs, and a top perforated member, with the filter media being retained between the top and bottom perforated members.

20. Apparatus for sequentially removing solids and aerosols from effluent of an industrial process and then treating gaseous pollutants in the effluent, said apparatus comprising:

(a) a housing having an effluent inlet and an effluent outlet;

(b) an impaction filter in the housing having a filter media for removing solids and aerosols, if any are present in the effluent, said impaction filter dividing the housing into an inlet filter chamber disposed upstream of the filter and in flow communication with the effluent inlet and an outlet filter chamber disposed downstream of the filter and in flow communication with the effluent outlet, said inlet and outlet chambers together defining a filtration zone;

(c) a regeneration system for removing solids and aerosols from one portion of the filter media while another separate portion of the media continues to filter the effluent, said regeneration system including a regeneration zone disposed in the housing and sealed from both the inlet and outlet filter chambers defining the filtration zone; and (d) a downstream pollution control device having an inlet in flow communication with the effluent outlet for treating gaseous pollutants in the effluent, said device including a pluggable flow path.

21. The apparatus of claim 20, wherein said pluggable flow path includes pluggable media for treating gaseous pollutants.

22. The apparatus of claim 20, wherein said regeneration zone comprises a heating zone including means for raising the temperature of the filter media to a level sufficient to decompose solids and aerosols if any are trapped in the filter media to a residue and a cleaning zone including means for removing the residue from the filter media, wherein said filtration, heating and cleaning zones include seals isolating the zones from each other.

23. The apparatus of claim 20, further comprising means for effecting relative rotation between the filter media and the filtration and regeneration zones such that said separate portions of the filter media are periodically subject to filtration in the filtration zone and regeneration in the regeneration zone wherein, during operation, at least one portion of the filter media continually filters the effluent.

24. Apparatus for conditioning effluent from an industrial process, said apparatus comprising:

(a) a housing having an effluent inlet and an effluent outlet; (b) an impaction filter in the housing having filter media for removing solids and aerosols if any are present in the effluent, said impaction filter comprising a support structure having a longitudinal axis, said impaction filter dividing the housing into an inlet filter chamber disposed upstream of said impaction filter and in flow communication with the effluent inlet and an outlet filter chamber disposed downstream of said impaction filter and in flow communication with the effluent outlet, said inlet and outlet filter chambers together defining a filtration zone such that the effluent flows in an axial direction generally parallel to the longitudinal axis;

(c) a regeneration system including means free of water for removing solids and aerosols from one portion of the filter media while another separate portion of the media continues to filter the effluent, said regeneration system including a regeneration zone disposed in the housing and sealed from both the inlet and outlet filter chambers defining the filtration zone.

* * * * *